Aug. 27, 1935.   V. J. M. ERAS   2,012,341
DOORLATCH
Filed Aug. 15, 1934
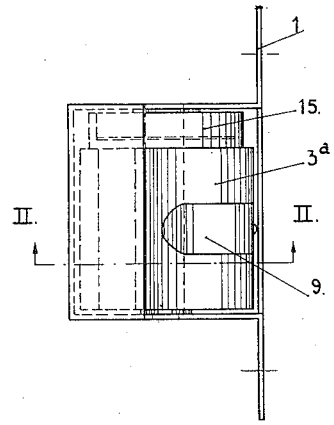
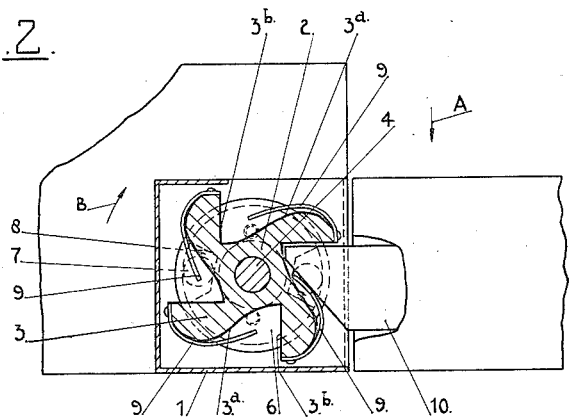
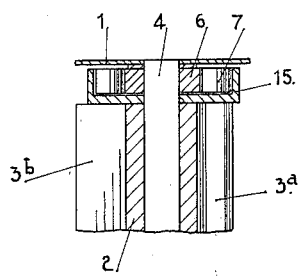
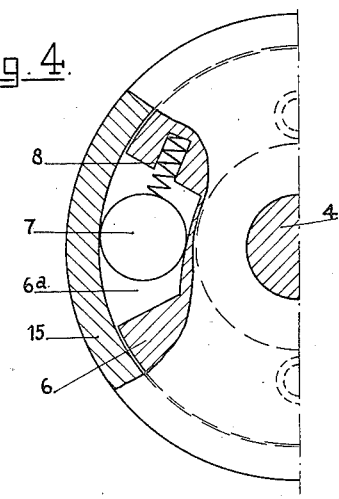
Inventor:
Vincent Joseph Marie Eras Patented Aug. 27, 1935

2,012,341

UNITED STATES PATENT OFFICE 2,012,341

DOORLATCH

Vincent Joseph Marie Eras, Dordrecht, Netherlands

Application August 15, 1934, Serial No. 739,864

2 Claims. (Cl. 292—340)

This invention relates to improvements in and connected with door latches and more particularly to latches comprising rotary keeper nabs formed with a number of projecting claws adapted to catch the bolt and coupled with a non-return clutch.

In order that these claws may be able to securely catch and hold the lock bolt, they must be formed with a straight front and arcuate back, so that, when the nab is in engagement with the bolt, the face of the nab which is in engagement with the straight face of the bolt, extends in parallel to the plane of movement of the bolt.

I have now found that in order to provide for a perfect functioning of a device of this kind and more especially for a permanent tight fit of the lock-bolt in the tooth gaps of the rotary nab, provision must be made for the inevitable wear of the arcuate rear faces of the claws which are struck and frictionally worn down by the bolt each time the door is closed. I have further found that provision must be made for a universal action of the non-return clutch connected with, and preventing rotation of, the nab in the reverse direction, i. e. for an action of this clutch which will set in, and securely arrest the said nab, in any position thereof.

To this end the claws are provided on their arcuate backs with small elastic tongues of hard resilient material such as steel springs, on which the back face of the latch bolt acts to turn the nab as far as it will go in the locking direction, these spring tongues taking up the frictional wear. Furthermore the non-return clutch is provided with springs acting on the balls or rollers forming part of the clutch in such manner as to prevent reverse movement of the rotary nab in any position of rotation thereof.

The said tongues or leaf springs and the straight front faces of the claws are so constructed as to provide spaces between adjacent claws in which when closing the door, the bolt is substantially completely enclosed between the leaf spring on one of the claws and the straight face of the following claw. With keeper nabs of this nature the bolt is gripped and held in any more or less closed position of the door so that clattering of the door is eliminated rendering the invention of special importance for the locks of doors in hospitals and the like.

The accompanying drawing represents by way of example and in a purely diagrammatic manner a constructional form of a door latch according to the invention; in this drawing:

Figure 1 is a front view, while

Figure 2 is a cross section on the line II—II in Figure 1 and

Figure 3 is a part longitudinal section,

Figure 4 is an enlarged partial cross section of the clutch mechanism showing the action of the spring-pressed rollers, discs or balls.

Referring to the drawing, 1 is the casing or housing of the keeper nab which consists of a body 2, formed with four claws 3 extending over the full height of said body. This body is rotatably mounted in the casing 1 around a vertical spindle 4. The bolt 5 is caught by and between the claws 3 of the body 2. The arcuate rear faces of the claws are covered to this effect by tongue springs 9, the action of which will be described below.

A cup-shaped member 15 is fixed to the body 2 and a member 6, which is fixed to the casing 1, extends into the hollow of said member 15. The member 6 is formed with two diametrically opposed recesses 6a, in each of which a roller 7 is positioned, which is acted upon by a coil spring 8 (Figure 4). The inner walls of the recesses 6a are eccentric to the circular circumferential wall of the cup-shaped member 15, thus forming cam faces, and the rollers 7 are wedged in between these two walls by the springs 8 and prevent any rotation of the nab 2 in a direction opposite to the arrow B, no matter at which point of its rotatory movement the nab is stopped. The parts 15, 6, 7 and 8 therefore constitute a non-return clutch allowing the nab 2 with the claws 3 to rotate in the direction of the arrow B only and reverse movement of such nab at any point of revolution thereof is prevented because the springs 8 hold the rollers constantly in wedged position. If the projecting bolt 5, in closing the door, comes into engagement with the arcuate back 3a of one of the claws 3, it pushes same away, so that the straight face 3b of the next-following claw comes to apply itself against the flat face of the bolt. The latter is then retained by said claw, since the body 2 is prevented by the non-return clutch from rotating back in the other direction.

It will be understood that by the engagement of the straight (flat) face 3b of the claw with the flat face of the bolt no force is exerted upon the bolt by said claw tending to push the bolt into the lock, if pressure is exerted upon the closed door in the direction in which same opens, i. e. opposite to the direction indicated by the arrow A.

The spring members 9 provided on the arcuate rear faces of the claws serve in the first line for taking up the frictional wear and for thus protecting these faces of the claws. On closing the door the chamfered edge of the bolt 10 will engage the spring 9 and turn the nab 2; partial rotation of this nab will already suffice to completely enclose the bolt, between the spring 9 of one claw and the straight face 3b of the next-following claw; the bolt is also retained by the claws if the door has not been well closed.

I wish it to be understood that I do not desire to be limited to any specific details shown and described since obvious modifications will occur to a person skilled in the art.

I claim:

1. A door latch comprising in combination, a rotary keeper nab, adapted to be engaged by a sliding latch bolt, a plurality of radially projecting claws on said nab, each claw being formed with an arcuate rear face and a substantially straight front face, which extends in parallel to the plane of movement of said bolt, protective leaf springs on the rear faces of the claws and a non-return clutch device associated with said nab.

2. A door latch comprising in combination, a rotary keeper nab adapted to be engaged by a sliding latch bolt, a plurality of radially projecting claws on said nab, each claw being formed with an arcuate rear face and a substantially straight front face, which extends in parallel to the plane of movement of said bolt, protective leaf springs on the rear faces of the claws, and a non-return clutch device associated with said nab, said clutch device comprising a cam face, a rolling member in contact with said cam face and a spring permanently acting on said rolling member to keep same in operative engagement with said cam face.

VINCENT JOSEPH MARIE ERAS.